(12) United States Patent
Courtaud et al.

(10) Patent No.: US 8,628,733 B2
(45) Date of Patent: Jan. 14, 2014

(54) METHOD FOR PREPARING URANIUM CONCENTRATES BY FLUIDIZED BED PRECIPITATION, AND PREPARATION OF $UO_3$ AND $U_3O_8$ BY DRYING/CALCINING SAID CONCENTRATES

(75) Inventors: Bruno Courtaud, Bellac (FR); Frederic Auger, Boisseuil (FR); Jacques Thiry, Ambazac (FR)

(73) Assignee: Areva NC, Paris (FR)

( * ) Notice: Subject to any disclaimer, the term of this patent is extended or adjusted under 35 U.S.C. 154(b) by 0 days.

(21) Appl. No.: 13/127,942

(22) PCT Filed: Nov. 7, 2008

(86) PCT No.: PCT/EP2008/065172
§ 371 (c)(1),
(2), (4) Date: May 5, 2011

(87) PCT Pub. No.: WO2010/051855
PCT Pub. Date: May 14, 2010

(65) Prior Publication Data
US 2011/0212005 A1 Sep. 1, 2011

(51) Int. Cl.
*C01G 43/00* (2006.01)
(52) U.S. Cl.
USPC ............ 423/15; 423/16; 423/253; 423/260; 264/0.5; 23/313 FB
(58) Field of Classification Search
USPC .................. 423/15, 16, 253, 260; 264/0.5; 23/313 FB, 300, 301
See application file for complete search history.

(56) References Cited

U.S. PATENT DOCUMENTS 2,770,521 A 11/1956 Louis
4,053,559 A * 10/1977 Hart et al. ............... 423/261
4,352,857 A 10/1982 Dugua
4,476,101 A * 10/1984 Dugua ..................... 423/253
4,530,823 A 7/1985 Dugua
4,971,734 A 11/1990 Floreancig et al.

FOREIGN PATENT DOCUMENTS

| EP | 0351334 | 1/1990 |
|----|---------|--------|
| FR | 1187352 | 9/1959 |
| FR | 2443424 | 7/1980 |
| FR | 2497236 | 7/1982 |
| FR | 2508025 | 12/1982 |
| GB | 900790 | 7/1962 |
| GB | 2051028 | 1/1981 |

OTHER PUBLICATIONS

International Search Report and Written Opinion in International Application No. PCT/EP2008/065172, mailed Aug. 25, 2009.
International Preliminary Report on Patentability in international Application No. PCT/EP2008/065172, dated Feb. 16, 2011.

\* cited by examiner

*Primary Examiner* — Steven Bos
(74) *Attorney, Agent, or Firm* — Nixon Peabody LLP

(57) ABSTRACT

Method for producing a uranium concentrate in the form of solid particles, by precipitation from a uranium-containing solution using a precipitating agent, in a vertical reactor comprising a base, a top, a central part, an upper part, and a lower part, the solid particles of the uranium concentrate forming a fluidized bed under the action of a rising liquid current which circulates from the base towards the top of the reactor successively passing through the lower part, the central part and the upper part of the reactor, and which is created by introducing a liquid recycling current (flow) at the base of the reactor, said liquid recycling current being tapped at a first determined level (A) in the upper part of the reactor and sent back without settling to the base of the reactor, excess liquid being also evacuated via an overflow located at a second determined level (B) in the upper part of the reactor; a method in which the upper limit (C) of the fluidized bed of solid particles is controlled so that it is positioned at a level below the first and second determined levels.

33 Claims, 6 Drawing Sheets

METHOD FOR PREPARING URANIUM CONCENTRATES BY FLUIDIZED BED PRECIPITATION, AND PREPARATION OF $UO_3$ AND $U_3O_8$ BY DRYING/CALCINING SAID CONCENTRATES

CROSS REFERENCE TO RELATED APPLICATIONS OR PRIORITY CLAIM

This application is a National Phase of, and which claims priority of, PCT/EP2008/065172, filed Nov. 7, 2008, entitled, "METHOD FOR PREPARING URANIUM CONCENTRATES BY FLUIDIZED BED PRECIPITATION, AND PREPARATION OF $UO_3$ AND $U_3O_8$ BY DRYING/CALCINING SAID CONCENTRATES".

TECHNICAL FIELD

The invention concerns a process for preparing uranium concentrates by fluidized bed precipitation from uraniferous (uranium-containing) solutions.

The invention also concerns a method for preparing $UO_3$ and $U_3O_8$ by drying or calcining uranium concentrates obtained using the method such as described herein, or using any other method for preparing uranium concentrates by fluidized bed precipitation.

The objective of processing uranium ores is the extraction of uranium from ores, purification and combining thereof so as to obtain a product called a concentrate, or uranate or "Yellow Cake" with high uranium content, for example comprising more than 70 weight % uranium.

The uranium ore is first crushed, ground, and then subjected to an operation to place the uranium in solution using a base or an acid, such as sodium carbonate for example or sulphuric acid, called attack or leaching.

After purifying and concentrating the solutions derived from leaching of the ore, the uranium is recovered in the form of uraniferous, uranium-containing liquors, generally acid, in a sulphate medium for example.

These solutions may also be in a chloride, ammonia, nitrate or carbonate medium depending upon the prior purification-concentration step.

The uranium concentrate is obtained from these uranium-containing liquor solutions by precipitation using precipitating reagents such as sodium hydroxide, magnesium oxide (magnesia), ammonia, ammonium uranyl tricarbonate and hydrogen peroxide $H_2O_2$.

Depending on the precipitating reagent used, the concentrate will therefore contain respectively sodium uranate, magnesium uranate, ammonium diuranate, ammonium uranyl tricarbonate, or uranium peroxide.

The precipitation of uranium peroxide using hydrogen peroxide, from a solution of uranium containing sulphates is described in particular in document U.S. Pat. No. 2,770,521.

This precipitation operation was generally and conventionally conducted in agitated tanks arranged in series, but the precipitate obtained showed numerous disadvantages regarding flowability, filtering capability and emission of high-uranium dusts.

To overcome these drawbacks, it was proposed to conduct precipitation in a fluidized bed.

For example, document FR-A-2 443 424 concerns a process for crystallizing and agglomerating a uranium salt namely sodium uranate, using sodium hydroxide, from uranium-containing solutions.

The system in this document is an extremely particular, slow system in which precipitation does not fully take place: as a result, at the top of the fluidization reactor, there subsists sodium uranate which has not precipitated or which precipitates very slowly forming fines. These fines entrained into the overflow must be managed, treated outside the reactor in an independent separate settling tank into which fine particles of sodium uranate can also be added. The fine particles are then sent back to the bottom, base of the reactor by means of a pump.

The quality of the product obtained with the method of this document is unsatisfactory: it is extremely difficult to control the precipitation and its yield. The management of fines is complex and requires the presence of additional settling tanks placed outside the fluidized bed reactor. The regulated forming of fines and the global kinetics of the process are difficult to achieve.

Finally, the method in this document specifically deals with the precipitation of sodium uranate and cannot easily be transposed to the preparation of other uranium concentrates.

In addition, mention was made in document FR-A-2 508 025 of a process for manufacturing uranium peroxide by precipitation from a solution of uranyl sulphate or uranyl nitrate in a fluidized bed using a solution of hydrogen peroxide.

The fluidized bed technique used in this document is the one described in document FR-A-1 187 352.

This technique consists of forming polycrystalline agglomerates by precipitating a supersaturated solution in the presence of a solid support represented by particles being fluidized derived from nucleation and growth of the solute. The formed seed crystals grow and coalesce with each other or with already existing agglomerates. These fine particles and these aggregates are held in suspension by means of a given flow rate of the uranium-containing solution to be precipitated or of recycled mother liquors. The supersaturation state remains constant through continuous feeding of substance to be crystallized.

The uranium peroxide powder obtained with the process in document FR-A-2 508 025 has good flowability, large particle size and does not contain any fine particles.

However, this process does not allow the easy treatment of all possible uranium-containing solutions using all possible precipitating agents. Document FR-A-2 508 025 only deals specifically with the preparation of uranium peroxide by precipitation with hydrogen peroxide.

This process can only be implemented easily with solutions to be precipitated that have a relatively low salt concentration and by using hydrogen peroxide as precipitation agent. Therefore, when the solutions to be precipitated have a high salt content e.g. sulphates or ammoniums, the precipitation reaction is slow, incomplete and requires pretreatment in a tank.

This pre-treatment comprises the precipitation of unwanted ions, for example using lime in the event of high sulphate content. Said pre-treatment described in document FR-A-2 497 236 is recommended by document FR-A-2 508 025.

This pre-treatment step is time-consuming and costly, generates solid waste and it would therefore be of interest if it could be avoided.

In addition, the process described in document FR-A-2 508 025 also has insufficient yield in terms of the quantity of uranate obtained.

The process in this document has the same disadvantages as the process in document FR-A-2 443 424, in particular regarding the management of fines entrained by the overflow into a separate settling tank.

It is also to be noted that in this document, the injection of fine particles into the fluidized bed reactor is in no way mentioned, since whilst this document mentions the feeding of a suspension containing 50 weight % uranium peroxide derived from a preceding operation in a crystallizer, this is made in a comparative example in which a series of four agitated crystallizers is used and not a fluidized bed.

Additionally, the properties of the concentrates obtained with the process in this document could be further improved.

In particular, it would be of interest to provide a method with which it is possible to obtain uranium concentrates such as concentrates of sodium uranate, magnesium uranate, ammonium diuranate ammonium uranyl tricarbonate and uranium peroxide in the form of powders having spherical particles (to impart good flowability to the powder) having very few fine particles (to improve radioprotection), good filtering capability, low humidity (to reduce drying costs and consumption of fossil energy) and high density (to reduce transport costs between uranium mines and conversion plants).

This latter property is of particular importance: uranium extraction mines are for the most part far distant from conversion plants. Transport accounts for a major cost and evidently the denser the uranate obtained the lower the cost of transport per unit weight of uranium.

It is to be noted that the problem of obtaining uranium concentrates of high density, from uranium peroxide for example, is in no way mentioned in document FR-A-2 508 025.

It would also be of interest to provide a method which, from uranium concentrates obtained using a fluidized bed process, can be used to prepare $UO_3$ or $U_3O_8$ similarly having excellent flowability, filtering capability, no fine particles, and being of high density.

Document EP-A1-0 351 334 describes a substantially similar method to the method of document FR-A-2 443 424 examined above. It concerns a method for precipitating uranium peroxide by precipitation from a uranium-containing solution of uranyl nitrate, using hydrogen peroxide in a fluidized bed reactor (see Example 2 and FIG. 1 of said document).

The reactor has feed inlets for uranium-containing solution (10) and $H_2O_2$ injectors (12).

The fines entrained in the overflow (9) are directed into a settling tank (21) then recycled at the bottom of the reactor via a recycling pump (19).

The method of this document has the same drawbacks as the method of document FR-A-2 443 424, in particular regarding the management of fines entrained, carried, in the overflow to a separate settling tank.

Document GB-A-2 051 028, which corresponds to FR-A-2 457 257, describes a process for producing ammonium uranate by precipitation from a supersaturated solution. This solution is obtained by reaction of a solution of uranyl nitrate with an ammonia solution, in a fluidized bed.

The mother liquors leaving the column through its top part are sent, to a settling tank (11), a part thereof is evacuated at (12) and the remainder is recycled at the base, bottom, of the column by means of the pump (13).

Here again, the process of this document has the same shortcomings as the process in document FR-A-2 443 424, in particular with respect to the management of fines carried by the overflow into a separate settling tank.

In the light of the foregoing, there is therefore a need for a method for preparing, producing, a uranium concentrate by precipitation in a fluidized bed, from a uranium-containing liquor solution, using a precipitation agent which allows control of the precipitation and of the yield thereof, which ensures simple management of fines, and which guarantees excellent regulation of the formation of fines and of the global kinetics of precipitation.

There is also a need for a method for preparing, producing, a uranium concentrate by precipitation in a fluidized bed, from a uranium-containing liquor, solution, by means of a precipitating agent, which can be used with high yield and with a large variety of uranium-containing solutions irrespective of their type, nature, their uranium concentration and their concentration of salts, and with a large variety of precipitating agents.

There is also a need for such a method which is simple, reliable, easy to implement and low cost.

There is further a need for such a method with which it is possible to obtain a concentrate in the form of a spherical powder, with few fine particles, that is easy to filter and of high density.

There is a further need for such a method with which it is possible to obtain concentrates having a very low impurity content, this property being the consequence of the physical characteristics of the product obtained, since it can be better washed and does not retain any impregnating solution containing impurities in its structure, the consequence of characteristics specific to the product obtained.

In other words, there is a need for a method which allows a reduction in transport costs by increasing the density of the uranium concentrate ("yellow cake"), a reduction in penalizing costs by preferably precipitating such a low-impurity product, and which provides an end product that is easy to filter and does not generate dust on handling in order to improve radioprotection.

Finally, there is a need for a method which allows the preparation, production of $UO_3$ or $U_3O_8$ from a uranium concentrate obtained in a fluidized bed e.g. ammonium diuranate, ammonium uranyl tricarbonate or uranium peroxide, whilst maintaining the excellent properties listed above of the concentrates obtained after precipitation in a fluidized bed.

The objective, goal, of the present invention is to provide a method for preparing, producing, uranium concentrates in a fluidized bed, and a method for preparing, producing, $UO_3$ and $U_3O_8$ from some of these uranium concentrates prepared by precipitation in a fluidized bed, which inter alia meet the above-listed needs and which meet the requirements and criteria mentioned in the foregoing.

It is a further objective, goal, of the invention to provide such a method for preparing, producing, uranium concentrates which does not have the shortcomings, defects, limitations and disadvantages of prior art methods, and which solves the problems of prior art methods as represented in particular by document FR-A-2 508 025 and the other above-cited documents.

This objectives, goals, and others are achieved, according to the invention, by a method for preparing, producing, a uranium concentrate in the form of solid particles, by precipitation from a uranium-containing solution using a precipitating agent, in a vertical reactor (1) comprising a base (bottom) (7), a top, a central part (2), an upper part (3) and a lower part (6), the solid particles of the uranium concentrate forming a fluidized bed under the action of a rising (upwardly flowing) liquid current (flow) which circulates from the base (7) towards the top of the reactor (1), successively passing through the lower part (6), the central part (2) and the upper part (3) of the reactor (1), and which is created by introducing a liquid recycling current (flow) (11) at the base (7) of the reactor (1), said liquid recycling current being tapped (withdrawn) at a first determined level (A) in the upper part of the reactor and sent back without decantation, settling, to the base (7) of the reactor (1), excess liquid being further evacuated via an overflow (10) located at a second determined level (B) in the upper part (3) of the reactor; a method in which the upper limit (C) of the fluidized bed of solid particles is controlled so that it lies at a level below the first and second determined levels.

The method of the invention has never been described in the prior art.

The method of the invention differs fundamentally from prior art methods in that the solid particles, in particular the fine particles of uranium concentrate, are kept at a level lower than the recycling level and lower than the overflow level in particular by regulating the recycling flow rate. This prevents the solid particles, in particular the fine particles of uranium concentrate, from being entrained, carried, in the overflow and into the recycling circuit.

The solid particles are maintained within the reactor and the entirety of precipitation and of particle growth takes place in the reactor. On leaving the reactor, both the overflow liquid and the recycling liquid contain little or no particles, in particular fines, of uranium concentrate, and also comprise little or no uranium in solution.

Since the particles of concentrate are not entrained into the overflow or recycling circuit, the method of the invention does not require any settling tank, with all related piping and pumps, to treat and manage these particles, in particular these entrained, carried fine particles. The installation for implementing the method can therefore be made globally more compact.

In general, the liquid recycling current is sent back directly to the base, bottom, of the reactor, without passing through an intermediate tank.

The reactor used for the method of the invention can be defined as a self-sufficient, self-sustaining reactor since the entirety of the precipitation takes place in the reactor itself and the management of solid particles, in particular of the fine particles, is conducted inside the reactor.

By thus maintaining the upper limit, the upper level of the fluidized bed at a level below the tapping (withdrawing) level of the liquid recycling current (flow), and below the overflow level, the residence time of the uranium-containing solution in the reactor is in fact increased, and the precipitation kinetics are also increased, this residence time and these kinetics being fully controlled.

In other words, by means of the method of the invention, by regulating the interface between the fluidized bed, the suspension of solids, and the liquid above said suspension, at the lowest possible level and at all events below the level of the overflow and the recycling tapping level, any entrainment of solids and in particular of fines is avoided.

In the prior art methods there is no regulation, no control over the level of the fluid or fluidized bed, and solid particles are present within the entire reactor, in the settling tank and in the recycling circuit from this settling tank. It is evidently impossible therefore to gain control over precipitation and growth of the solid particles. In particular, in the prior art reactors, the finest solid particles become entrained, carried, into the settling tank.

The yield of precipitation obtained with the method of the invention is excellent and the properties of the concentrate obtained, subsequent due to full control over the precipitation process, are also excellent.

The upper limit of the fluidized bed can be controlled by adjusting, regulating, controlling, containing, monitoring, the flow rate of the liquid recycling current (which could also be called the liquid fluidization current).

The flow rate of the liquid recycling current is the fundamental parameter which allows the regulation, adjustment, controlling and containing of the upper limit, the upper level of the fluidized bed in the reactor.

In addition to adjusting the flow rate of the liquid recycling current, it is possible to control, regulate the upper limit of the fluidized bed by acting on one or more among the following parameters: one or more of the levels at which a current (flow) of uranium-containing solution and a current of precipitating agent solution or dispersion are introduced into the reactor, the concentration of uranium-containing solution, the concentration of the precipitating agent, reagent the geometry and/or the size of the reactor, the geometry and/or the size of one or more from among the upper part, the central part and the lower part of the reactor, and in the case where an agitation of the content of the reactor is carried out, the parameters governing this agitation.

It has been found that a reactor in which the upper part (3) is formed, composed of a truncated, flattened cone (frustum) (4) flaring outwardly from a central cylindrical part (2) into a cylindrical part (5) of larger diameter than the central part (2), largely facilitates the regulation, controlling of the upper limit of the fluidized bed, evidently in conjunction with adjustment of the flow rate of the liquid recycling current.

Said shape, which could be termed a "flared " shape of the upper part of the reactor, reduces the velocity of the rising (upwardly flowing) current, thereby ensuring that the interface between the fluidized bed and the liquid above said fluidized bed, is maintained at the aforementioned level.

It was found that said flared shape is distinctly more advantageous in particular for controlling the interface, the upper limit of the fluidized bed, than a very tall and very thin reactor.

With said flared shape of the upper part of the reactor, it can be considered that this part optimally plays the role of a settling tank (a role it already ensures with other shapes). The settling tank which in the prior art methods is separate from the reactor is thus integrated, included in the reactor which largely contributes to the compactness of the system.

Preferably, the upper limit of the fluidized bed can be controlled by adjusting, regulating the flow rate of the liquid recycling current; by applying agitation to the content of the reactor, and by regulating the parameters governing this agitation; and by using a reactor whose upper part has the above-described "flared" shape.

Advantageously, a current of uranium-containing solution and a current of precipitating agent solution or dispersion are directly introduced into the reactor.

Advantageously, a suspension of fine particles of uranium concentrate is introduced into the reactor, preferably in the upper part thereof. By "fine" particles is generally meant particles whose largest dimension—such as the diameter—is no more than 10 µm, and preferably of the order of 10 µm.

This addition is of particular advantage when kinetics are slow, and allows the overcoming of a number of disadvantages of prior art methods.

It is to be noted that in the prior art methods said introduction, injection of fine particles into the reactor and in particular into its upper part is not necessary or even desirable since the upper part of the reactor in the methods such as those described in the above-mentioned documents is filled with a liquid having a high content of solids, whereas according to the invention, in the upper part of the reactor, above the upper level of the fluid or fluidized bed and in the overflow, there is little or no uranium in solution or in particles, and the liquid concerned has a very low load of solids.

In one first embodiment of this introduction, injection of fine particles, prior to the introducing of currents of uranium-containing solution and precipitating agent solution that is preferably made directly into the reactor, part of the current of uranium-containing solution and part of the current of precipitating agent solution are tapped (withdrawn), and the tapped part of the currents is injected into a precipitation tank in which the uranium concentrate is precipitated to form a suspension of fine particles (or seed crystals) of uranium concentrate, and said suspension of fine particles (seed crystals) which precipitated in the precipitation tank is sent in the upper part of the reactor.

As specified above, by proceeding in this manner some disadvantages of the processes of the prior art are overcome, in particular if precipitation kinetics are slow.

The current of uranium-containing solution and the current of precipitating agent solution may be introduced independently into the upper part, the central part, the lower part or into the recycling circuit of the reactor. Preferably, the current of uranium-containing solution and the current of precipitating agent solution are both introduced, fed, in the central part of the reactor.

The part of the current of uranium-containing solution which is tapped (withdrawn) according to this first embodiment, so that it can be precipitated in a precipitation tank separate from the fluidized bed, generally represents from 0, 1, 2, 3, 4, 5 or 10% to 50% of the flow rate, preferably from 10% to 20% of the flow rate of the current of the uranium-containing solution to be precipitated that it is desired to treat in the fluidized bed. The limit of 0% covers the possible, but not general case in which the system operates without any withdrawal of the current of uranium-containing solution.

Similarly, the part of the current of precipitating agent solution that is tapped (withdrawn), to conduct precipitation of the tapped part of the current of uranium-containing solution in the separate tank, generally represents from 0, 1, 2, 3, 4, 5, or 10% to 50% of the flow rate, preferably from 10% to 20% of the flow rate of the precipitating agent solution sent into the fluidized bed reactor.

Similarly, the limit of 0% covers the possible, but non-general case in which the system operates without any tapping of precipitating agent solution.

In a second embodiment of this introduction, injection of fine particles, a current of uranium-containing solution and a current of precipitating agent solution are directly introduced into the reactor, and fine particles (or seed crystals) precipitated from the uranium concentrate are withdrawn, recovered from the reactor and are injected into the upper part of the reactor.

The current of uranium-containing solution and the current of precipitating agent solution can be introduced independently into the upper part, into the central part or into the lower part of the reactor, or into the recycling circuit of the reactor. Preferably, the current of uranium-containing solution and the current of precipitating agent solution are both introduced into the central part of the reactor.

The fine particles precipitated from the uranium concentrate are preferably taken, withdrawn from the central part of the reactor.

The injection of fine particles, precipitated for example according to the above-described first and second embodiments, is of particular advantage for the treatment of solutions to be precipitated that have a high salt concentration.

By high salt concentration is generally meant a total concentration of salts equal to or more than 150 g/l of uranium-containing solution, bearing in mind that the salt concentration generally ranges from 30 to 400 g/l.

These salts can particularly be chosen from among sulphates, ammoniums, nitrates, chlorides and carbonates.

The method of the invention, when applied to these solutions with high salt concentrations, particularly allows a pre-treatment step with lime to be avoided, which is time-consuming and costly and generates waste.

In both embodiments of the injection of fine particles according to the invention it is possible to feed directly the fluid, fluidized bed, generally positioned in the central part of the reactor, with the uranium-containing solution to be precipitated without said prior pre-treatment.

This direct feeding is possible in the first embodiment of the injection, by precipitating a small part of the feed current, flow, into a separate tank then injecting the suspension of fine particles (seed crystals) of precipitated uranium concentrate into the top of the fluid, fluidised bed, namely into the upper part of the reactor; whilst in the second embodiment of the injection, in which the fluidized bed can also be directly fed with uranium-containing solution to be precipitated, the "fine particles" (seed crystals) taken, withdrawn, from the central, intermediate part of the fluidized bed reactor are recycled and these fines are then injected into the upper part of the fluidized bed reactor.

The precipitation of a small part of the flow, current, of uranium-containing solution in the first embodiment of the injection, and the recycling of fines in the upper part of the fluidized bed, which merges with the upper part of the reactor, in the second embodiment of the injection, allow in both cases the promoting of nucleation and the pre-treatment of the entirety of the solution.

In the first embodiment of the injection, only a small portion of uranium-containing solution is treated in the separate tank, positioned upstream of the reactor, and the largest part of the current of the solution for example 90% is sent into the reactor. Feeding of the reactor is therefore scarcely perturbed.

It is generally possible with the method of the invention, in particular with the first and second embodiments of the injection of fine particles, to treat a wide variety of uranium-containing solutions with a wide variety of precipitating agents, without a prior step applied to the entire uranium-containing solution.

One of the major problems with prior art methods for preparing, producing, uranium concentrates by precipitation is therefore remedied, and it can be said that the method of the invention is universal both for uranium-containing solutions and for the reagents, precipitating agents.

Therefore the uranium-containing solution to be treated may be a solution containing ions chosen from among carbonate, ammonium, nitrate, sulphate and chloride ions.

In particular, this solution may be a solution of uranyl nitrate or a solution of uranyl sulphate.

The total concentration of these ions, salts, generally ranges from 30 to 400 g/l.

The uranium content of the uranium-containing solution to be treated is generally from 1 to 400 g/l, preferably from 20 to 100 g/l.

The precipitation agent may be solid or liquid.

In an unexpected and particularly advantageous manner the method of the invention, for the first time, allows the use of precipitation agents in solid form such as magnesia (magnesium oxide), lime and the saline peroxides, percarbonates and perborates in solid form. These solid precipitation agents can especially be used in the form of suspensions or dispersions of these agents, also called "milks" such as milk of lime and milk of magnesia.

The precipitation agent may therefore be chosen for example from among magnesia (magnesium oxide), sodium hydroxide, lime, hydrogen peroxide; the saline peroxides, percarbonates and perborates, such as the percarbonates, perborates, peroxides of sodium, potassium or magnesium; ammonia and ammonium bicarbonate, in relation to the concentrate, precipitate, it is desired to obtain namely and respectively magnesium uranate, sodium uranate, uranium peroxide, ammonium diuranate or ammonium uranyl tricarbonate.

It is to be noted that with the method of the invention uranium concentrates are obtained, namely concentrates generally containing the above-cited compounds, which all have excellent properties in terms of flowability, filtering capability, free of fines, inherent in fluidized bed precipitation.

Additionally, the products obtained have high density.

Finally the products obtained have a very low content of impurities. This property is the consequence of the physical characteristics of the product obtained since it can be better washed and does not comprise any impregnating solutions containing these impurities, in its structure.

A suspension of uranium precipitate, concentrate is generally withdrawn, extracted from the lower part of the reactor and then subjected to solid-liquid separation for example by filtration, and the uranium concentrate is recovered, collected.

Advantageously, both in the first and in the second embodiment of the method of the invention for preparing uranium concentrate by precipitation with a precipitating agent in a fluidized bed reactor, from a uranium-containing solution, the load, hold up, content or quantity of solid, generally composed solely of the uranium concentrate, contained in the reactor ranges from 0.5 to 3 kg/l.

The quantity of uranium contained in the fluidized bed reactor, in other words uranium hold-up in the fluidized bed, is therefore greater and even substantially greater than the hold-up routinely used in fluidized bed reactors of the prior art.

Unexpectedly, it was able to be shown (see FIG. 4) that the density (in $g/cm^3$) of some uranates, in particular magnesium uranate, depends directly upon the quantity of uranium contained in the reactor and that—as a result—by using a higher uranium hold-up the density of the product obtained such as magnesium uranate is also much higher.

This increase in the density of the uranates is obtained without affecting the other advantageous properties related to the use of a fluidized bed for precipitation: flowability, filtering capability, fine-free, low impurity content.

The method generally comprises a start-up phase then a stationary phase, and the high quantity of solid (uranium) in the reactor, or high hold-up, load, is obtained for example:

by withdrawing less product from the reactor, during start-up, than the feed quantity; and/or by adjusting, during the stationary phase, the tap flow rate (the flow rate of the current withdrawn from the reactor) so as to maintain the load, hold up, in the lower part of the reactor.

The invention also concerns a method for preparing $UO_3$ powder or $U_3O_8$ powder from some uranium concentrates prepared using a precipitation process in a fluidized bed, in particular from some uranium concentrates prepared by the above-described method (according to both the first and the second embodiments thereof) in which the following successive steps are conducted:

a)—a uranium concentrate containing, (based on) $UO_4$ or ammonium diuranate or ammonium uranyl tricarbonate, is produced by precipitation with a precipitating agent in a fluidized bed reactor, from a uranium-containing solution, preferably using the above-described method (according to both the first and second embodiments thereof); then b)—a drying step of said concentrate is carried out after separation for example filtration (the term "precipitate" or the term "concentrate" can be indifferently used here), at a temperature of 60 to 120° C., for example of 105° C., for a time of 1 to 8 hours, for example 4 hours; then a calcining step of said concentrate is performed at a temperature of 180 to 350° C., for example of 250° C., for a time of 15 min to 8 hours, preferably for 1 hour to 2 hours, whereby a powder of $UO_3$ is obtained; or else (in lieu and stead of step b)), c)—a single calcining step is performed (instead of 2 successive steps of drying then calcining of the said concentrate mentioned above under b)) at a temperature of 600 to 900° C. for example 700° C., for a time of 15 min to 2 hours, for example for one hour, whereby a powder of $U_3O_8$ is obtained.

The combining of precipitation of uranium concentrates in a fluidized bed with drying and/or calcining under the specific conditions set forth above, has never been either mentioned or suggested in the prior art and in particular in document FR-A-2 508 025.

The drying of the products derived from precipitation in a fluid, fluidized bed, such as uranium peroxide under the specific conditions given above, allows a $UO_3$ powder to be obtained which, like the uranate powder precipitated in a fluid, fluidized bed from which it is prepared, has excellent properties of sphericity, flowability, high density, non-presence of fines. In addition, the heat treatment for drying allows a gain in uranium content of about 10% whilst maintaining all the above-listed advantageous properties of the powder before drying.

Similarly the calcining of products derived from precipitation in a fluid, fluidized bed such as uranium peroxide leads to a $U_3O_8$ powder which maintains all the excellent properties of the initial uranates precipitated in the fluidized bed, such as flowability, no fines, sphericity, low impurity content.

In particular, the $U_3O_8$ obtained is fine-free, does not generate dust, which is a considerable advantage in terms of radioprotection. The $U_3O_8$ obtained with this method according to the invention has the behaviour of calibrated sand and no longer of a flour.

In addition, the calcining heat treatment unexpectedly allows a gain in density to be obtained, of about 40% for $U_3O_8$, whilst the uranium content also increases by about 10%, the other initial excellent properties of the uranate powder being fully maintained.

Finally, the $UO_3$ powder prepared following the preparation method of the present invention also displays excellent fluorination capability. This excellent fluorination or hydrofluorination capability is one of the surprising, unexpected properties of the powder prepared using the method of the invention. Fluorination or hydrofluorination capability is a very difficult property to control, and it could not be foreseen that it was possible to obtain excellent fluorination or hydrofluorination capabilities with the $UO_3$ powder prepared by the preparation method of the invention.

This means that the $UO_3$ powder obtained with said method can further be subjected to an additional fluorination or hydrofluorination step.

The invention will now be described in connection with the preferred embodiments thereof in the following description which is non-limiting and given for illustration purposes, with reference to the appended drawings in which.

Figure 3:
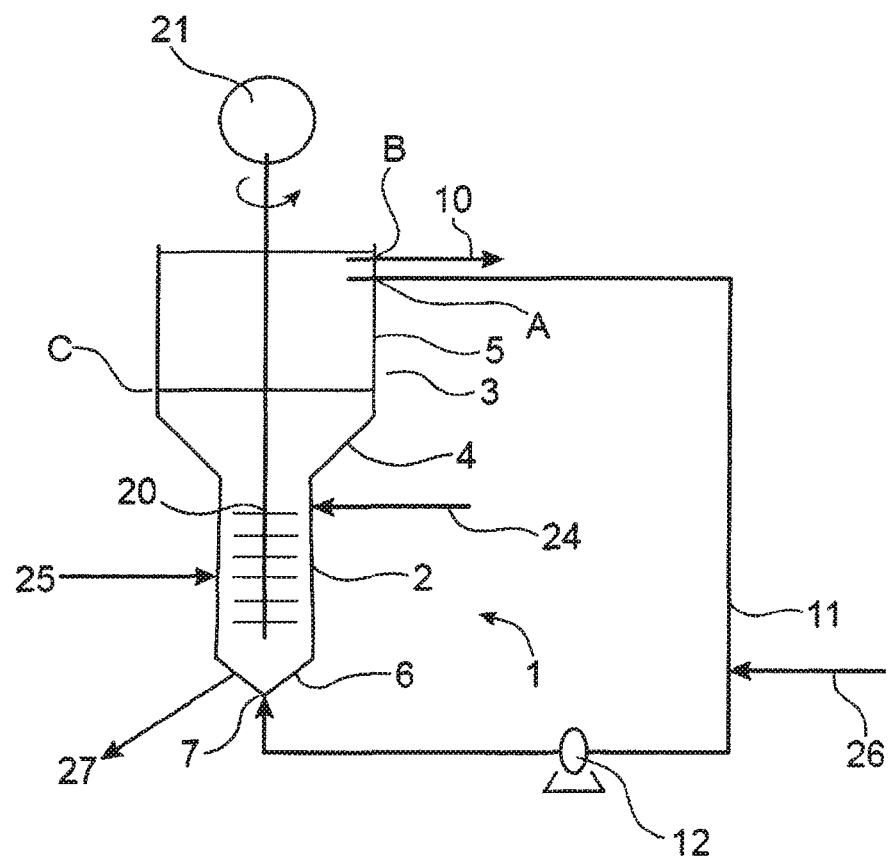
Figure 4:
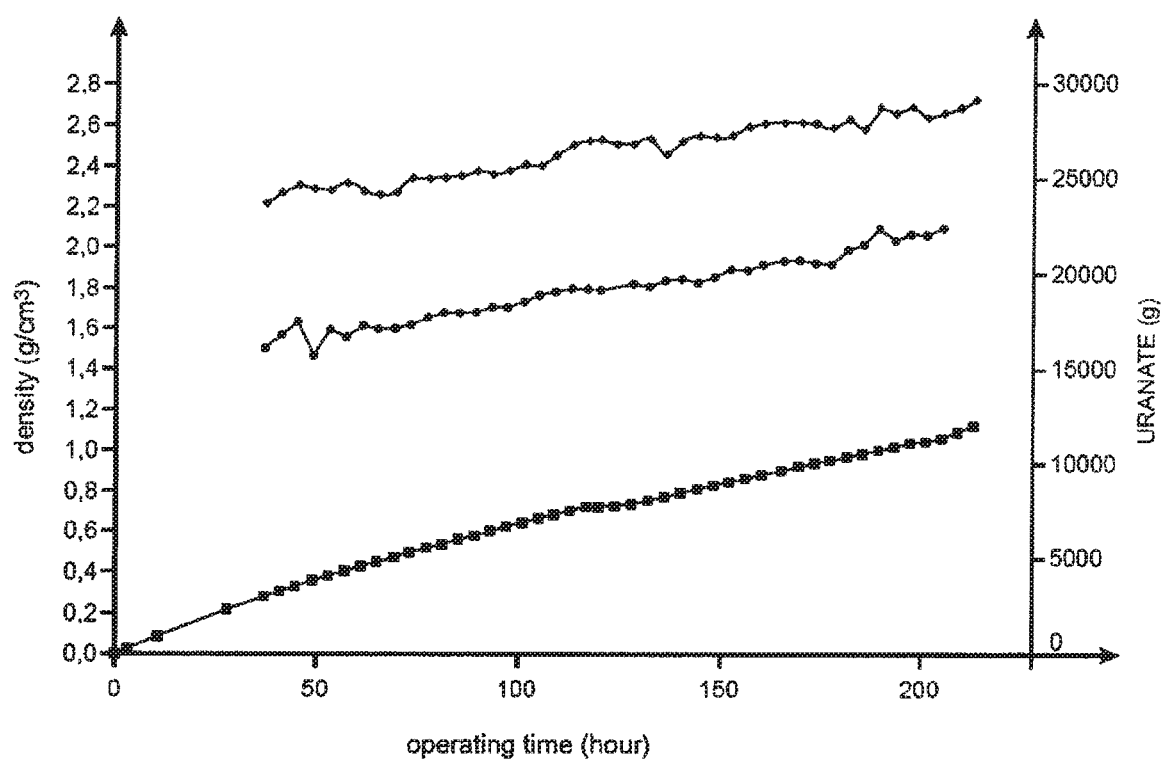
Figure 5A:

FIG. 3 is a side cross-sectional view of an installation for implementing a method according to the invention for preparing a uranium concentrate in a fluidized bed reactor by precipitation from a uranium-containing solution, FIG. 4 is a graph giving the density of the pulp (g/cm$^3$) (dots ♦) and of the uranate powder (g/cm$^3$) (dots ●), and the uranate load, hold-up (g) (dots ■) as a function of the operating time of a fluidized bed reactor (hours): see Example 3;

FIG. 5A is a photograph taken under scanning electron microscope of an uranate precipitated in a fluid, fluidized bed according to the invention.

The magnification is 1000 and the scale in the figure is 20 μm (see Example 7).

Figure 5B:
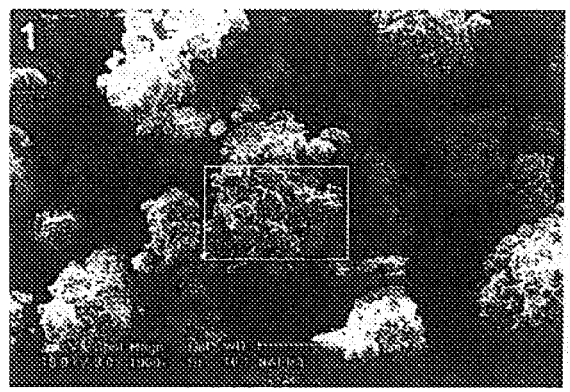

FIG. 5B is a photograph taken under scanning electron microscope of an uranate precipitated in a tank.

The magnification is 1000 and the scale in the figure is 20 μm (see Example 7).

Figure 6:
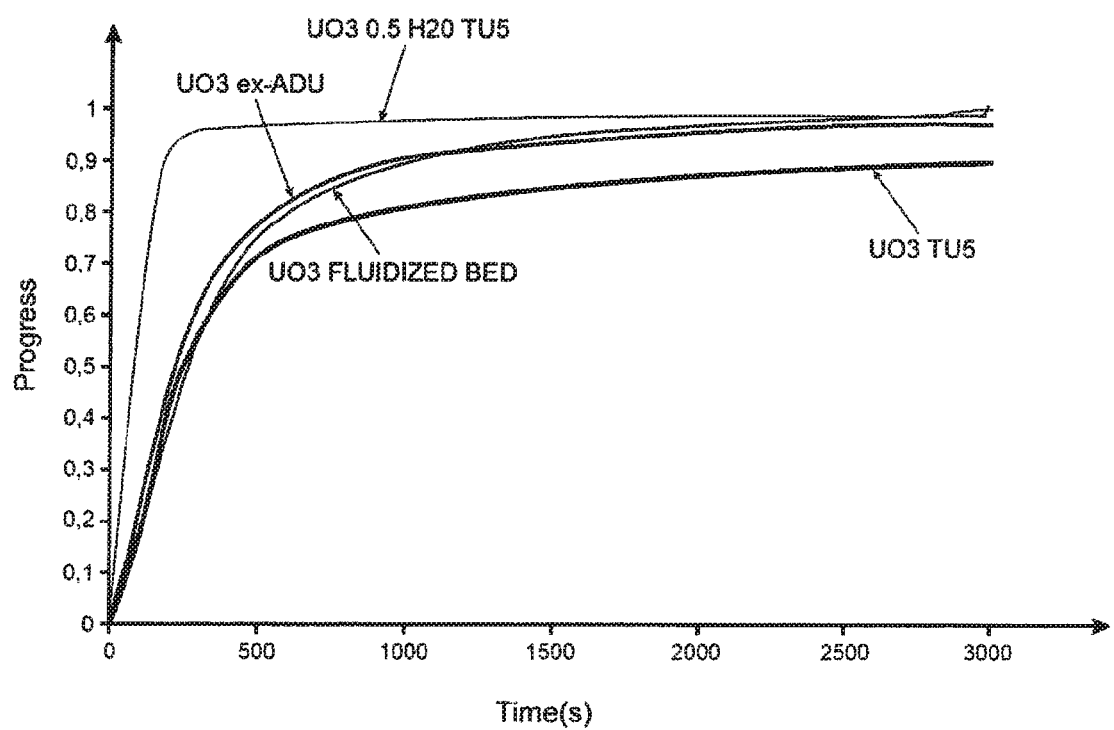

FIG. 6 is a graph giving the results obtained during an assay for the fluorination capability of different $UO_3$ powders, namely:

a powder obtained by precipitation of ammonium diuranate in tanks, referenced "$UO_3$-ex-ADU";

a powder obtained by precipitation from uranyl nitrate, in tanks, in an industrial installation, referenced "$UO_3$ TU5";

the same powder as the preceding powder but slightly re-hydrated, referenced "$UO_3$ 0.5 $H_2O$ TU5"; and a "fluidized bed $UO_3$" powder which is a powder obtained by precipitating uranate in a fluidized bed, then drying, according to the method of the invention.

The progress of fluorination is plotted along the ordinate, and time along the abscissa (in seconds).

Figure 1:
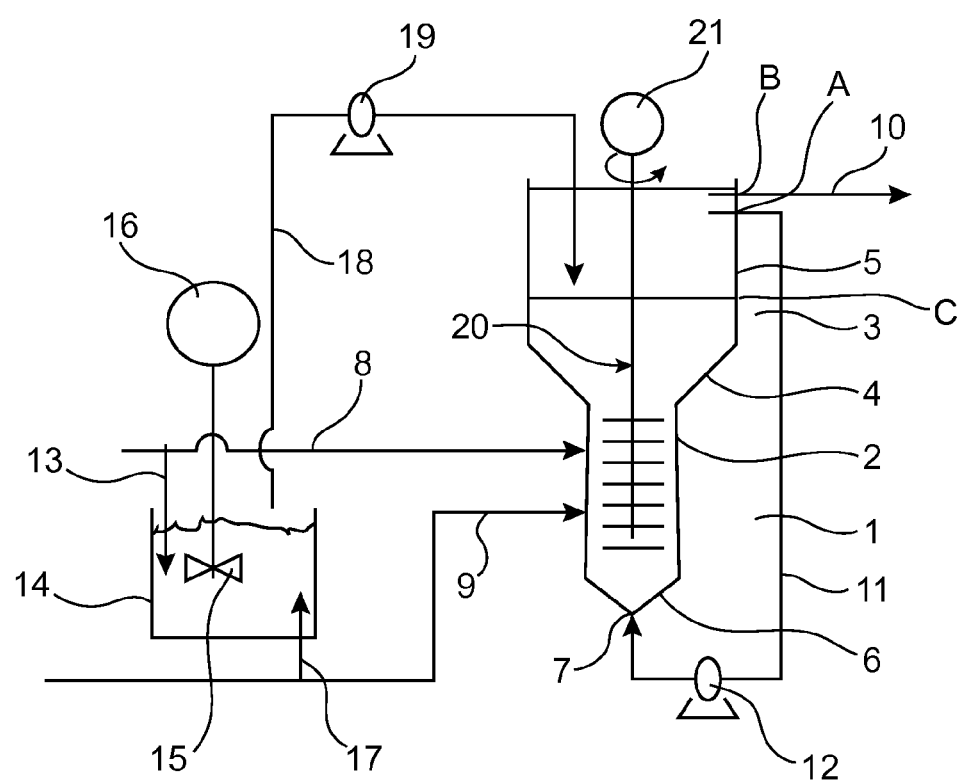
FIG. 1 is a side cross-sectional view of an installation for implementing a method of the invention for preparing a uranium concentrate in a fluidized bed reactor by precipitation from a uranium-containing solution, wherein the injection of fine particles is carried out according to the first embodiment of said injection.
Figure 2:
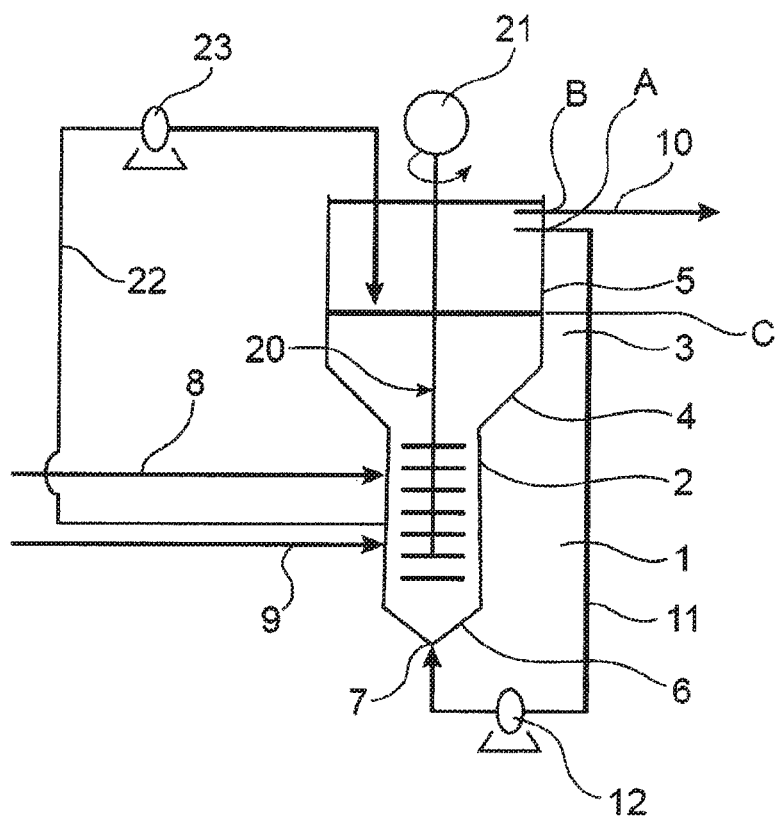
FIG. 2 is a side cross-sectional view of an installation for implementing a method according to the invention for preparing a uranium concentrate in a fluidized bed reactor, by precipitation from a uranium-containing solution, wherein the injection of fine particles is carried out according to the second embodiment of said injection.

The installation shown in FIGS. 1, 2 and 3 can be used for preparing uranium concentrates, namely ammonium uranyl tricarbonate, sodium uranate, magnesium uranate, uranium peroxide, or ammonium diuranate using the method of the invention; these concentrates then being subjected to drying or calcining according to the invention, to obtain powders of $UO_3$ or $U_3O_8$.

The installation shown in FIG. 1, as essential element, comprises a fluidized bed reactor (1) arranged vertically and which comprises three main parts: a central, vertical, cylindrical part (2) (whose cross-section is generally circular), an upper part (3) formed of (composed of) a flattened, truncated, cone (4) flaring out from the central cylindrical part (2) into a cylindrical part (5) of larger diameter than the central part (2), and finally a lower part formed of (composed of) a cone (6) converging from said central part (2) and whose apex (7) forms the base, bottom of the reactor (1).

The reactor (1) is generally fed at its central part with an uranium-containing solution via pipe (8).

The reactor (1), in the central part (2), is also generally fed with precipitating agent solution, for example $H_2O_2$, via pipe (9).

However the feeding of uranium-containing solution and/or precipitating agent solution could be made into the upper part or into the bottom part, or simultaneously into any two parts, or into the three parts of the reactor. The treated, hence uranium-depleted solutions (also called "mother liquors") leaving the reactor are partly evacuated through an overflow (10), whilst the other part is recycled via a pipe (11) and a pump (12) to the base, bottom (7) of the reactor (1). The uranium-depleted solutions therefore circulate from bottom upwards in the reactor (1) and ensure fluidization of the particles.

In conformity with the first embodiment of the injection of the fine particles into the reactor, a small part, for example representing 10% of the flow rate of the uranium-containing solution circulating in the pipe (8), is tapped, withdrawn, via a pipe (13) and sent into a precipitation tank (14), preferably provided with an impeller, agitator (15) e.g. a paddle impeller driven by a motor (16).

Similarly a small part, for example representing 10% of the flow rate of precipitating agent solution such as $H_2O_2$, is withdrawn via a pipe (17) and sent to the precipitation tank (14).

Part of the content of the tank (14) composed of precipitation seed crystals i.e. fine particles of concentrate which have precipitated, is injected into the top of the reactor (1) via pipe (18) provided with a pump (19). The flow rate of solution circulating in the pipe (18), derived from the tank (14), which is injected into the top of the reactor (1) therefore also represents 10% for example of the total flow rate of uranium-containing solution and precipitating agent solution introduced into the central part of the reactor.

The reactor in FIG. 1 is generally provided with an agitation, stirring, device, for example an agitator, impeller with paddles or helical blades (20) driven in rotation by a motor (21).

The agitation parameters such as the shape of the paddles or helical blades, the speed of rotation are some of the factors which can be used to control the interface, the upper limit of the fluidized bed.

The type of impeller, agitator, and the speed permit a turbine-type action and hence an increase in fluidization rate.

The installation illustrated FIG. 2 is substantially similar to the one in FIG. 1 with respect to the fluidized bed (1), recycling circuit of the mother liquors and the overflow.

Similarly, the fluidized bed reactor (1) is fed directly into one part thereof which may be the central part (2), with the uranium-containing solution and the precipitating agent solution via pipes (8) and (9). However, part of these solutions is not tapped, withdrawn, as in FIG. 1, but it is the entirety of the flow rates of these two solutions that is injected into a part of the reactor which may be the central part of the reactor (1).

In the installation shown in FIG. 2 provision is made for a pipe (22) provided with a pump (23) which withdraws the fine particles of uranium precipitate (by fine particles is generally meant that their particle size is equal to or less than 10 μm) from a part which may be the central part (2) of the fluidized bed reactor (1) and re-injects the same into the upper, top part (3, 5) of the reactor.

The reactor in FIG. 2, as in FIG. 1, is generally provided with an agitation device (20) driven by a motor (21).

In FIG. 3, the installation comprises a fluidized bed reactor substantially similar to the one already described in FIGS. 1 and 2. This reactor, like the reactor of FIGS. 1 and 2, can be provided with an agitation, stirring device driven in rotation by a motor (21).

The installation of FIG. 3 can in fact be defined as a traditional, conventional installation which can operate in traditional, conventional manner or which may be operated so as to implement the method of the invention, in particular by controlling the upper limit of the fluidized bed of solid particles so that it is positioned at the previously defined level.

In the installation of FIG. 3, part of the uranium-depleted solutions ("mother liquors") in excess at the top of the reactor (1) is evacuated via an overflow (10), whilst the other part of the uranium-depleted solutions is recycled and sent to the base, bottom (7) of the reactor (1) via a pipe (11) equipped with a pump (12).

The uranium-containing solution can be fed, introduced (24) into the reactor in a part thereof, which, for example, may be its central, intermediate, cylindrical part (1).

It is also possible to feed, introduce the solution of precipitating agent into the reactor, into a part thereof which may be its central part (2). The point at which the precipitating agent solution is introduced, fed, may be located at a lower level (25) than the point used for introducing, feeding, and the uranium-containing solution.

The precipitation reagent, or else another reagent such as sodium hydroxide solution, can also be introduced into the pipe (11) at (26), for example upstream of the pump (12).

Finally, it is possible to tap or withdraw the suspension, of uranium concentrate, precipitate, located inside the reactor by means of a tap point 27 generally provided in the lower part of the reactor. The uranium concentrate is generally recovered after solid-liquid separation, for example by filtering the tapped, withdrawn, suspension.

A tap point similar to tap point (27) can also be provided in the reactors of FIGS. 1 and 2, preferably at the lower part thereof.

Various sensors and measuring devices, for example a pH measuring device, can be fitted to the fluidized bed reactor of FIG. 1, 2 or 3 and/or on the connection pipes.

The principle of the method according to the invention can be explained in non-limiting manner with reference to one of FIGS. 1 to 3, it being pointed out that the reactor for implementing the method of the invention comprises several zones.

EXAMPLE 1 (COMPARATIVE)

In this example, uranium peroxide is precipitated with hydrogen peroxide from a 70 g.l$^{-1}$ uranium solution, in the presence of 100 g.l$^{-1}$ of sulphates. Precipitation is conducted in a traditional, conventional fluidized bed installation such as the one of FIG. 3, causing it to operate in a manner not conforming to the invention.

After a feed time of 40 hours, the uranium content in the overflow is 1370±145 mg.l$^{-1}$, which means that full precipitation has not been achieved and that the efficacy of the method is poor.

To obtain better efficacy, recourse should be made to a pre-treatment, prior precipitation such as described in document FR-A-2 497 236 with all the disadvantages thereof.

EXAMPLE 2

According to the Invention

In this example the same uranium-containing solution is prepared as in Example 1 with $H_2O_2$ but using a method of the invention with regulation of the interface, using an installation such as the one of FIG. 1.

A uranium content of 74±18 mg.l$^{-1}$ is reached in the overflow after 20 hours' operation, without having recourse to a pre-treatment.

EXAMPLE 3

This example examined the influence of the quantity of uranium contained in the reactor (Hold Up) on the density of uranate precipitated in a fluidized bed.

The installation used is illustrated in FIG. 3.

The reactor is provided with an impeller 20 driven at a rotation speed of 36 rpm.

The reactor, in its central part (24), is fed with an uranium-containing brine (having a Cl$^-$ content of 120 g/l) at pH 3, containing 56 g.l$^{-1}$ uranium, and at a flow rate of 1.1 l.h$^{-1}$.

The overflow (10) evacuates part of the uranium-depleted solutions ("mother liquors") from the top of the reactor at a flow rate of 1.1 l.h$^{-1}$, whereas the remainder of the uranium-depleted solutions ("mother liquors") is recycled to the base, bottom of the reactor (7) at a flow rate of 40 l.h$^{-1}$ via pipe (11) and by means of a pump (12).

On this pipe (11) and upstream of the pump (12), a 100 g.l$^{-1}$ magnesium oxide solution is injected (26) at a flow rate of 174 ml.h$^{-1}$.

During the initial functioning of the installation, the uranium hold-up is zero and it increases with operating time.

The graph in FIG. 4 clearly shows the correlation between the increase in uranate hold-up (g) in the fluidized bed (dots ■) over time, and the density of the precipitated magnesium uranate (g/cm$^3$) both for the pulp (dots ♦) located in the lower part of the reactor, in the precipitation zone, and for the powder derived therefrom (after drying) (dots ●).

EXAMPLE 4

In this example UO$_3$ powder is prepared, at an initial step, by first precipitating uranium peroxide in a fluidized bed then, at a second step, by drying the precipitate obtained.

Step One: Precipitation of Uranium Peroxide

The installation used to conduct precipitation is substantially similar to the one of FIG. 3 aside from a few slight modifications.

Evidently the installations in FIGS. 1 and 2 could also be used to carry out the precipitation.

The central part (22) of the reactor is therefore fed with a brine, at pH 3, which contains 35 g.l$^{-1}$ uranium, and at a flow rate of 1.7 l.h$^{-1}$.

On the recycling pipe (11), upstream (24) of the pump (12), a 3.75M NaOH solution is injected at a flow rate of 105 ml.h$^{-1}$. The recycling flow rate in the pipe (11) is 50 l.h$^{-1}$.

Into the central part of the reactor (2), a 7.5% $H_2O_2$ solution is also injected (23) at a rate of 150 ml.h$^{-1}$.

The suspension is tapped, withdrawn, from the lower zone of the central part 25.

This tapped suspension (1 litre) is filtered, washed with water, and then left to dry 12 hours at 105° C.

The uranium content and density of the powder are measured in accordance with standard DIN ISO 787-11.

Step Two: Drying of the Precipitated Powder

The powder is then left to dry in accordance with the invention for 8 hours at 180° C., until a brick red powder of UO$_3$ is obtained. The uranium content and its density were measured and recorded in Table 1 below.

TABLE 1

|  | U (%) | Density |
|---|---|---|
| UO$_4$, 2H$_2$O (105° C.) | 70.4 | 2 |
| UO$_3$ (180° C.) | 81.4 | 1.99 |

Heat treatment at 180° C. allowed a gain of about 10% in uranium content whilst preserving the physical properties of the powder, in particular its high density.

EXAMPLE 5

In this example, the UO4, 2H2O powder obtained after step one in Example 4 was calcined for two hours at 800° C. so as to obtain a black powder of $U_3O_8$.

The characteristics of the $U_3O_8$ are: 85% uranium and density of 2.8.

Samples taken of powders obtained at different operating phases, namely on start-up and before stationary operation of the fluidized bed, according to step one in Example 4, confirmed the relationship between the density of $UO_4$ and the density of $U_3O_8$.

The results of these measurements are grouped together in Table 2 below.

TABLE 2

| $UO_4$ Density | $U_3O_8$ Density after calcining at 800° C. | Gain in density |
|---|---|---|
| 1.34 | 1.86 | +39% |
| 1.40 | 1.93 | +38% |
| 1.92 | 2.66 | +39% |
| 1.99 | 2.82 | +42% |

In addition, the $U_3O_8$ powders maintain the initial properties of the $UO_4$ powders.

Examples 4 and 5 show that the conversion to $UO_3$ and/or $U_3O_8$ of uranium peroxide, derived from fluidized bed precipitation using the method of the invention, allows the uranium content thereof to be increased (~10%) whilst preserving the good initial properties of the powder (flowability, density, . . . ).

EXAMPLE 6

In this example, it is shown that the calcining of a uranate powder prepared using a fluidized bed process is not affected by the calcining treatment to obtain $U_3O_8$ according to the invention, whilst uranate powder prepared using a "tank process" has less good characteristics which in addition are further deteriorated by the calcining treatment.

The uranate powder prepared in a fluidized bed is $UO_4$, $2H_2O$ powder obtained in Example 4, and this powder is calcined under the conditions of Example 5.

$UO_4$ powder prepared in a tank is obtained in the following manner: the precipitation reagents are gradually added to the uranium-containing solution under stirring, agitation, in a tank, whilst maintaining the pH at between 2 and 4. After 1 hour's stirring, the precipitated uranate pulp is filtered, washed then dried at 105° C.

The calcining of this power was conducted under the same conditions as for the powder prepared in a fluidized bed according to the method of the invention i.e. under the conditions of Example 5.

Measurements of particle size and density performed on the $UO_4$ and $U_3O_8$ powders are grouped together in following Table 3:

TABLE 3

| | | Particle size | | | |
|---|---|---|---|---|---|
| | | $D_{10}$ (µm)[1] | $D_{50}$ (µm) | $D_{90}$ (µm) | Density |
| Fluidized bed | $UO_4$ | 27 | 44 | 67 | 1.99 |
| | $U_3O_8$ | 20 | 41 | 64 | 2.82 |
| Tank | $UO_4$ | 0.45 | 13 | 32 | 1.2 |
| | $U_3O_8$ | 0.25 | 3.7 | 16 | 1.7 |

[1] $D_{10}$ = 10% particles of smaller diameter than the indicated value

This table 3 shows that:
- the $D_{10}$ of the powder derived from a fluidized bed is higher than that of a powder that is prepared in a tank, this indicating that there are practically no fine particles in the fluidized bed of the method according to the invention. The calcining of the product derived from the fluidized bed does not have any major effect on $D_{10}$;
- the mean particle size ($D_{50}$) is higher for a product prepared in a fluidized bed using the method of the invention, than for a powder that is prepared in a tank and calcining, which has no effect on the product obtained in a fluidized bed, degrades the mean diameter of the product obtained in a tank.

EXAMPLE 7

In this example, it is shown that the morphology of the powders derived from fluidized bed precipitation using the method of the invention imparts better filtering capability thereto.

TABLE 4

| | Filtering flow rate |
|---|---|
| $UO_4$ precipitated in a tank (Ex. 6) | 345 kg sec/m² · h |
| $UO_4$ precipitated in a fluidized bed (Ex. 4) | 960 kg sec/m² · h |

That is to say an improvement in filter flow rate by a factor of 2.8.

The residual humidity after filtering (interstitial water) is lower for these same powders derived from a fluidized bed preparation method according to the invention (Table 5).

TABLE 5

| | $H_2O$ content | |
|---|---|---|
| | Tank | Fluidized bed |
| $UO_4$ | 40% | 10% |
| Magnesium uranate | 50% | 10% |

The lower residual humidity of the powders prepared in a fluid, fluidized bed process using the method of the invention allows substantial savings in energy to be achieved, related to the final drying of the uranium concentrate thus obtained.

FIGS. 5A and 5B show the difference in morphology of the powders obtained using the "tank process" or the fluidized bed process respectively.

The powder obtained with the fluidized bed process using the method of the invention has particles that are much more "spherical".

EXAMPLE 8

In this example we examined the reactivity to hydrofluorination of the $UO_3$ obtained after using the method of the invention to dry the $UO_4$ precipitated in a fluid, fluidized bed according to the method of the invention, and it was compared with other $UO_3$: $UO_3$ ex-ADU, $UO_3$-$TU_5$ and $UO_3$ $0.5H_2O$ $TU_5$.

The uranium precipitates are effectively intended to be fluorinated (to $UF_4$ form) from $UO_3$.

Products which leave ore processing plants require a purification step before fluorination.

There exists a fluorination capability assay which can be used to determine the "reactivity" of the precipitates.

This assay was applied to a $UO_3$ powder prepared in a fluidized bed and calcined according to the invention, and gave identical results to those of products usually intended for fluorination (cf. curves in FIG. 6).

If the uranium precipitate derived from the fluidized bed is sufficiently pure (converter specifications) it could even be envisaged to fluorinate the product directly and thereby avoid all the purification steps.

The graph of FIG. 6 shows the good reactivity of the $UO_3$ obtained after drying the $UO_4$ precipitated in a fluidized bed according to the invention (fluidized bed $UO_3$).

The invention claimed is:

1. Method for producing a uranium concentrate in the form of solid particles, by precipitation from a uranium-containing solution using a precipitating agent, in a vertical reactor comprising a base, a top, a central part, an upper part, and a lower part, the solid particles of the uranium concentrate forming a fluidized bed under the action of a rising liquid current which circulates from the base towards the top of the reactor successively passing through the lower part, the central part and the upper part of the reactor, and which is created by introducing a liquid recycling current flow at the base of the reactor, said liquid recycling current flow being tapped at a first level (A) in the upper part of the reactor and sent back without settling to the base of the reactor, excess liquid being further evacuated via an overflow located at a second level (B) in the upper part of the reactor; wherein the upper limit (C) of the fluidized bed of solid particles is controlled so that said upper limit (C) is positioned at a level below the first level and the second level.

2. The method according to claim 1, wherein the upper limit of the fluidized bed is controlled by adjusting the flow rate of the liquid recycling current flow.

3. The method according to claim 2, wherein the upper limit of the fluidized bed is controlled by acting on one or more from among the following parameters: one or more of the levels at which a current of uranium-containing solution and a current of precipitating agent solution or dispersion are introduced into the reactor, the concentration of the uranium-containing solution, the concentration of the precipitating agent, the geometry and/or size of the reactor, the geometry and/or size of one or more from among the upper part, the central part and the lower part of the reactor, and in the case where an agitation of the content of the reactor is carried out, the parameters governing this agitation.

4. The method according to claim 1, wherein the upper part of the reactor is formed of a truncated cone flaring outwardly from a central cylindrical part into a cylindrical part of larger diameter than the central part.

5. The method according to claim 2, wherein the upper limit of the fluidized bed is controlled by adjusting the flow rate of the liquid recycling current flow; by agitating the content of the reactor and by regulating the parameters governing this agitation; and by using a reactor whose upper part is formed of a truncated cone flaring outwardly from a central cylindrical part into a cylindrical part of larger diameter than the central part.

6. The method according to claim 1, wherein a current of uranium-containing solution and a current of precipitating agent solution or dispersion are introduced directly into the reactor.

7. The method according to claim 1, wherein a suspension of fine particles of uranium concentrate is introduced directly into the reactor.

8. The method according to claim 7 wherein, prior to the introduction of the currents of uranium-containing solution and precipitating agent solution into the reactor, part of the current of uranium-containing solution and part of the current of precipitating agent solution are tapped, and the tapped parts of the currents are injected into a precipitation tank in which the uranium concentrate precipitates to form a suspension of fine particles of uranium concentrate, and said suspension of fine particles which precipitated in the precipitation tank is sent in the upper part of the reactor.

9. The method according to claim 8, wherein the current of uranium-containing solution and the current of precipitating agent solution are both introduced in the central part of the reactor.

10. The method according to claim 8, wherein the tapped part of the current of uranium-containing solution represents from 0, 1, 2, 3, 4, 5, or 10%, to 50%, of the flow rate of the current of the uranium-containing solution.

11. The method according to claim 8, wherein the tapped part of the current of precipitating agent solution represents from 0, 1, 2, 3, 4, 5 or 10%, to 50%, of the flow rate of the current of the precipitating agent solution.

12. The method according to claim 7, wherein precipitated fine particles of uranium concentrate are withdrawn from the reactor and injected into the upper part of the reactor.

13. The method according to claim 12, wherein the current of uranium-containing solution and the current of precipitating agent solution are both introduced into the central part of the reactor.

14. The method according to claim 12, wherein the precipitated fine particles of uranium concentrate are withdrawn from the central part of the reactor.

15. The method according to claim 1, wherein a suspension of the uranium concentrate is withdrawn from the lower part of the reactor then subjected to solid-liquid separation and the uranium concentrate is recovered.

16. The method according to claim 1 wherein the hold-up or quantity of solid in the reactor ranges from 0.5 to 3 kg/l.

17. The method according to claim 16, wherein the method comprises a start-up phase then a stationary phase, and the quantity of solid inside the reactor is obtained by withdrawing less product from the reactor during start-up than the feed quantity; and/or by adjusting the tap flow rate during the stationary phase in order to maintain the hold-up in the lower part of the reactor.

18. The method according to claim 1, wherein the uranium-containing solution is a solution containing ions selected from the group consisting of carbonate, ammonium, nitrate, sulphate and chloride ions.

19. The method according to claim 18, wherein the total concentration of said ions ranges from 30 to 400 g/l.

20. The method according to claim 1, wherein the uranium-containing solution is a highly concentrated solution whose salt concentration is equal to or more than 150 g/l.

21. The method according to claim 1, wherein the uranium content in the uranium-containing solution ranges from 1 to 400 g/l.

22. The method according to claim 1, wherein the precipitating agent is solid or liquid.

23. The method according to claim 22, wherein the precipitating agent is selected from the group consisting of magnesia, sodium hydroxide, lime, hydrogen peroxide, saline peroxides, saline percarbonates, saline perborates, ammonia and ammonium bicarbonate.

24. The method according to claim 1, further comprising either:

(1) a drying step of said uranium concentrate is carried out after separation at a temperature of 60 to 120° C., for a time of 1 to 8 hours; followed by a calcining step of said uranium concentrate is performed at a temperature of 180 to 350° C., for a time of 15 min to 8 hours, to obtain a $UO_3$ powder; or (2) a single calcining step of said uranium concentrate is conducted at a temperature of 600 to 900° C., for a time of 15 min to 2 hours, to obtain a $U_3O_8$ powder.

25. The method according to claim 24, wherein the $UO_3$ powder or $U_3O_8$ powder is further subjected to a fluorination or hydrofluorination step.

26. The method according to claim 1, wherein a suspension of fine particles of uranium concentrate is introduced directly into the reactor in its upper part.

27. The method according to claim 10, wherein the tapped part of the current of uranium-containing solution represents from 10% to 20% of the flow rate of the current of the uranium-containing solution.

28. The method according to claim 11, wherein the tapped part of the current of precipitating agent solution represents from 10% to 20% of the flow rate of the current of the precipitating agent solution.

29. The method according to claim 22, wherein the precipitating agent is selected from the group consisting of percarbonates, perborates, and peroxides of sodium, potassium or magnesium.

30. The method according to claim 24, wherein the (1) drying step of said uranium concentrate is carried out after separation at a temperature of 105° C., for a time of 4 hours; followed by the calcining step of said uranium concentrate is performed at a temperature of 250° C., for a time of 1 hour to 2 hours, to obtain a $UO_3$ powder; or the (2) single calcining step of said uranium concentrate is conducted at a temperature of 750° C., for a time of one hour to obtain a $U_3O_8$ powder.

31. The method according to claim 24, wherein the uranium concentrate contains $UO_4$, ammonium diuranate, or ammonium uranyl tricarbonate.

32. The method according to claim 1, wherein a suspension of the uranium concentrate is withdrawn from the lower part of the reactor then subjected to solid-liquid separation, wherein said solid-liquid separation is a filtration.

33. The method according to claim 1, wherein the precipitating agent is solid and is in the form of a suspension or dispersion.

* * * * *